UNITED STATES PATENT OFFICE.

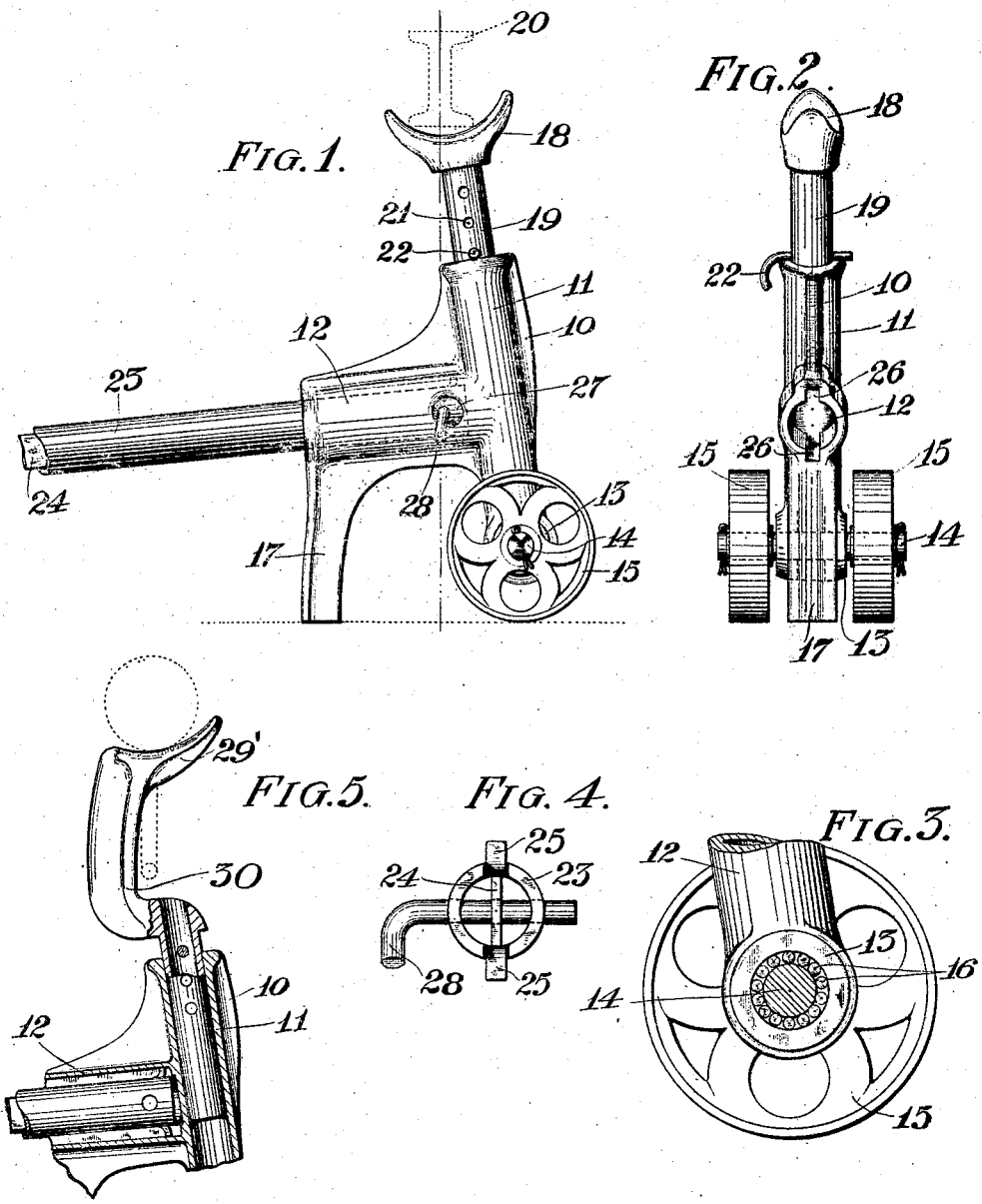

CHRISTIAN H. ROSE AND ADAM HEINZ, OF MILWAUKEE, WISCONSIN.

AUTOMOBILE-JACK.

1,307,600.  Specification of Letters Patent.  Patented June 24, 1919.

Application filed September 29, 1917.  Serial No. 193,963.

*To all whom it may concern:*

Be it known that we, CHRISTIAN H. ROSE and ADAM HEINZ, citizens of the United States, and residents of Milwaukee, Milwaukee county, Wisconsin, have invented new and useful Improvements in Automobile-Jacks, of which the following is a description, reference being had to the accompanying drawings, which are a part of this specification.

This invention has for its object to provide jacks for garage use in quickly lifting the weight of automobiles from the tires in order that the tires may be removed or other repair work done.

An object of the invention is to provide a jack which may be quickly operated without the necessity for a ratchet action or a screw action for the purpose.

Another object of the invention is to provide a jack which will be capable of engaging the rear axle direct notwithstanding the presence of a truss rod therebeneath.

With the above and other objects in view, the invention consists in the automobile jack as herein claimed and all equivalents.

Referring to the accompanying drawings, in which like characters of reference indicate similar parts in different views:

Figure 1 is a side view of an automobile jack constructed in accordance with this invention;

Fig. 2 is an end view thereof with the handle removed;

Fig. 3 is a detail view showing the roller bearing for the shaft;

Fig. 4 is an end view of the removable handle; and

Fig. 5 is a detail view of the device provided with a modified form of axle engaging seat.

In these drawings 10 indicates the body portion of the jack which is preferably in the form of a casting forming a tubular stem socket 11 and a handle socket 12 at right angles thereto. At the lower end of the stem socket is a transversely extending bearing 13 containing a shaft 14 having rollers 15 mounted on its ends. The bearing 13 is preferably provided with rollers 16 around the shaft 14, as shown in Fig. 3, to relieve the friction between the parts. The end of the handle socket 12 is provided with a leg 17 which will stand on the floor only when the stem socket 11 is inclined, as seen in Fig. 1.

An axle engaging seat 18 in the form of a yoke on a stem 19, which slidably fits in the stem socket 11, is adapted to engage and support the axle 20 of an automobile. The stem 19 is provided with a number of openings 21 through one of which a pin 22 is passed to engage the end of the stem socket 11 and thus permit the device to be adjusted as to length.

A removable handle 23 is fitted in the handle socket 12 and preferably consists of a metal tube, such as an ordinary pipe, reinforced by a flat metal strip 24 tightly fitting therein from one end to the other. In order that this reinforcement may be always placed in a vertical position when the handle is attached, the tube has lugs 25 cut from its ends and bent out therefrom and adapted to enter key grooves 26 in the top and bottom of handle socket 12. These key grooves 26, furthermore, adapt the device for use with an ordinary flat bar-like handle which will fit in said grooves instead of within the socket proper. Openings 27 in the handle socket 12 permit a bent retaining pin 28 being passed through an opening 29 in the end of the handle to keep the handle in place.

In operation the jack is rolled along the floor to the position for use, and when adjusted to the proper height is advanced toward the axle of the automobile with the handle in a raised position. With the seat engaging the underside of the axle 20, the handle is forced downwardly, causing the jack to move on its rollers 15 beneath the axle to lift the same. The rollers continue beyond the position in which the jack is vertical and until the leg 17 engages the floor, and here the jack will stand with the weight of the automobile resting thereon and the handle 23 may be removed so as to be out of the way. When the work is completed and it is desired to return the weight of the automobile to its wheels, the handle is returned to its socket and is lifted, thus lifting the leg 17 and drawing the jack to its vertical position and beyond, allowing the axle to return to its normal position.

The operation of lifting an automobile may very quickly be performed with this jack, for when the jack is in place it requires only a single movement to complete the operation, and likewise to remove it a single lifting movement on the handle lowers the car into place.

Great difficulty has usually been found in placing a jack beneath the rear axle housing when such rear axle housing is provided with a truss bar as usual. The form of axle supporting seat shown in Fig. 5 avoids all difficulty because of its being provided with a horn 29′ to bear against the axle housing and the undercut space 30 to receive the truss bar.

What we claim as new and desire to secure by Letters Patent is:

An automobile jack, comprising a jack member mounted on wheels and having a supporting leg, an axle engaging seat thereon, said jack member being provided with a handle socket having opposite key grooves, a tubular handle member fitting in the socket and provided with a flat reinforcing strip therein, and lugs formed on the handle member in the plane of the reinforcement and adapted to fit in the key grooves.

In testimony whereof, we affix our signatures, in presence of two witnesses.

CHRISTIAN H. ROSE.
ADAM HEINZ.

Witnesses:
R. S. C. CALDWELL,
H. D. CHASE.